(12) United States Patent
Tomikawa et al.

(10) Patent No.: US 11,982,222 B2
(45) Date of Patent: May 14, 2024

(54) WASTEGATE VALVE DEVICE, TURBINE, AND TURBOCHARGER

(71) Applicant: MITSUBISHI HEAVY INDUSTRIES ENGINE & TURBOCHARGER, LTD., Sagamihara (JP)

(72) Inventors: Kunihiro Tomikawa, Tokyo (JP); Toru Hoshi, Tokyo (JP); Takeshi Yasoshima, Tokyo (JP); Naoto Tashiro, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/018,169

(22) PCT Filed: Aug. 17, 2020

(86) PCT No.: PCT/JP2020/030969
§ 371 (c)(1),
(2) Date: Jan. 26, 2023

(87) PCT Pub. No.: WO2022/038653
PCT Pub. Date: Feb. 24, 2022

(65) Prior Publication Data
US 2023/0265784 A1   Aug. 24, 2023

(51) Int. Cl.
*F02B 37/18*   (2006.01)
*F01D 17/10*   (2006.01)

(52) U.S. Cl.
CPC .......... *F02B 37/183* (2013.01); *F01D 17/105* (2013.01); *F05D 2220/40* (2013.01); *F05D 2260/606* (2013.01)

(58) Field of Classification Search
CPC ...... F02B 37/18; F02B 37/183; F02B 37/186; F02B 37/162; F01D 17/105; F16K 31/521;
(Continued)

(56) References Cited

U.S. PATENT DOCUMENTS

| | | | |
|---|---|---|---|
| 10,590,793 B1 * | 3/2020 | Roszko | F02B 37/183 |
| 2007/0119170 A1 * | 5/2007 | Masson | F01D 17/105 |
| | | | 60/605.1 |

(Continued)

FOREIGN PATENT DOCUMENTS

| | | |
|---|---|---|
| JP | 2011-144762 A | 7/2011 |
| JP | 2018-127989 A | 8/2018 |

(Continued)

OTHER PUBLICATIONS

International Preliminary Report on Patentability and Written Opinion of the International Searching Authority for International Application No. PCT/JP2020/030969, dated Mar. 2, 2023, with an English translation.

(Continued)

*Primary Examiner* — Topaz L. Elliott
*Assistant Examiner* — Ryan C Clark
(74) *Attorney, Agent, or Firm* — Birch, Stewart, Kolasch & Birch, LLP (57) ABSTRACT

A wastegate valve device according to at least one embodiment is a wastegate valve device disposed on a bypass passage bypassing a turbine of a turbocharger arranged on an exhaust gas passage of an engine, including: a valve seat surface formed at an outlet of the bypass passage; and a wastegate valve body which includes a support arm supported rotatably about an axis and a valve body supported by the support arm, the valve body being configured to come into and out of contact with the valve seat surface in (Continued)

accordance with rotation of the support arm. In the wastegate valve device according to at least one embodiment, the valve seat surface is inclined with respect to a direction orthogonal to an axial direction of the bypass passage, as viewed from a direction of the above-described axis.

7 Claims, 6 Drawing Sheets

(58) Field of Classification Search
CPC ....... F02M 26/70; F02C 9/18; F05D 2220/40; F05D 2260/606
See application file for complete search history.

(56) References Cited

U.S. PATENT DOCUMENTS

| | | | |
|---|---|---|---|
| 2011/0173974 A1* | 7/2011 | Grabowska | F01D 17/105 60/602 |
| 2012/0192557 A1* | 8/2012 | Johnson | F02F 1/243 60/599 |
| 2013/0199175 A1 | 8/2013 | Hoshi et al. | |
| 2014/0072412 A1* | 3/2014 | Marques | F02B 37/183 415/144 |
| 2014/0345273 A1* | 11/2014 | Yamaguchi | F02B 37/186 60/602 |
| 2015/0125273 A1* | 5/2015 | Tschirschke | F02B 37/186 415/145 |
| 2015/0292394 A1* | 10/2015 | Uibelhoer | F02B 37/183 415/145 |
| 2015/0361985 A1* | 12/2015 | Edwards | F04D 17/10 60/605.1 |
| 2016/0084163 A1* | 3/2016 | Swartz | F02C 6/12 60/605.1 |
| 2017/0022890 A1* | 1/2017 | Chu | F02B 37/025 |
| 2017/0030261 A1* | 2/2017 | Yasoshima | F02B 37/186 |
| 2017/0145908 A1* | 5/2017 | Uneura | F01D 17/105 |
| 2017/0152793 A1 | 6/2017 | Albrecht et al. | |
| 2017/0167364 A1* | 6/2017 | Jeanson | F02C 6/12 |
| 2017/0276064 A1* | 9/2017 | Cooley | F01D 5/02 |
| 2018/0080370 A1* | 3/2018 | Genin | F02B 37/013 |
| 2018/0195432 A1* | 7/2018 | Sparrer | F16K 1/2014 |
| 2019/0003366 A1 | 1/2019 | Kimura et al. | |
| 2019/0078507 A1 | 3/2019 | Iwata et al. | |
| 2019/0234304 A1* | 8/2019 | Kitamura | F02B 39/00 |
| 2019/0249596 A1 | 8/2019 | Ito | |
| 2020/0116079 A1* | 4/2020 | Sano | F02B 37/183 |
| 2021/0017900 A1* | 1/2021 | Mikami | F16K 1/2007 |
| 2021/0277821 A1* | 9/2021 | Heddy, III | F02C 6/12 |
| 2021/0348520 A1* | 11/2021 | Cooley | F01N 3/2892 |

FOREIGN PATENT DOCUMENTS

| | | |
|---|---|---|
| JP | 2019-11746 A | 1/2019 |
| JP | 2019-49211 A | 3/2019 |
| JP | 2019-138216 A | 8/2019 |
| JP | 2019-214944 A | 12/2019 |
| JP | 2020-51395 A | 4/2020 |
| WO | WO2015/097786 A1 | 7/2015 |

OTHER PUBLICATIONS

International Search Report and Written Opinion of the International Searching Authority for International Application No. PCT/JP2020/030969, dated Sep. 15, 2020.

* cited by examiner

FIG. 6

WASTEGATE VALVE DEVICE, TURBINE, AND TURBOCHARGER

TECHNICAL FIELD

The present disclosure relates to a wastegate valve device, a turbine, and a turbocharger.

BACKGROUND

A turbocharger may be provided with a wastegate valve in order to suppress an excessive increase in boost pressure. The wastegate valve is configured to adjust an inflow amount of an exhaust gas to a turbine of a turbocharger by opening and closing a wastegate flow passage which serves as a bypass passage bypassing the turbine.

CITATION LIST

Patent Literature

Patent Document 1: JP2018-127989A

SUMMARY

Technical Problem

For example, in a turbocharger used for a vehicle such as an automobile, conventionally, control of an opening degree of a wastegate valve has mainly been control of deciding whether to fully open or fully close the wastegate valve depending on whether a parameter related to overspeeding of the turbocharger, such as a compressor outlet pressure, exceeds a preset threshold.

In recent years, however, there has been an increasing demand for precise control of the boost pressure. Accordingly, there is also an increasing demand for control accuracy of a flow rate of an exhaust gas bypassing a turbine.

In view of the above, an object of at least one embodiment of the present disclosure is to improve control accuracy of the flow rate of the exhaust gas bypassing the turbine.

Solution to Problem (1) A wastegate valve device according to at least one embodiment of the present disclosure is a wastegate valve device disposed on a bypass passage bypassing a turbine of a turbocharger arranged on an exhaust gas passage of an engine, including: a valve seat surface formed at an outlet of the bypass passage; and a wastegate valve body which includes a support arm supported rotatably about an axis and a valve body supported by the support arm, the valve body being configured to come into and out of contact with the valve seat surface in accordance with rotation of the support arm. The valve seat surface is inclined with respect to a direction orthogonal to an axial direction of the bypass passage, as viewed from a direction of the axis.

(2) A turbine according to at least one embodiment of the present disclosure includes the wastegate valve device having the above configuration (1).

(3) A turbocharger according to at least one embodiment of the present disclosure includes the turbine having the above configuration (2).

Advantageous Effects

According to at least one embodiment of the present disclosure, it is possible to improve control accuracy of a flow rate of an exhaust gas bypassing a turbine.

DETAILED DESCRIPTION

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Overall Configuration of Turbocharger 1

Figure 1:
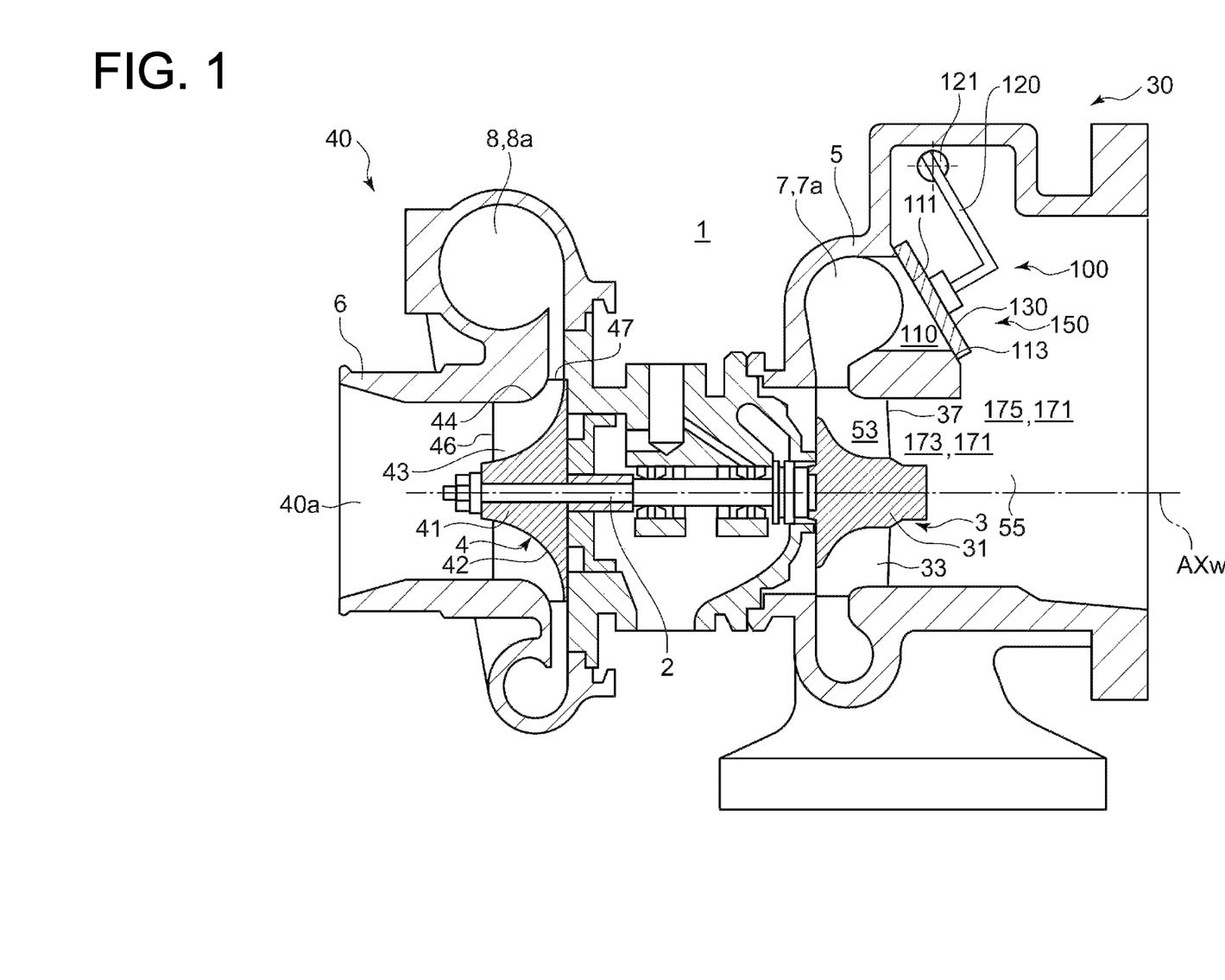
FIG. 1 is a cross-sectional view showing an example of a turbocharger according to some embodiments.

FIG. 1 is a cross-sectional view showing an example of a turbocharger 1 according to some embodiments.

The turbocharger 1 according to some embodiments is an exhaust turbocharger for supercharging intake air of an engine mounted on a vehicle such as an automobile, and is arranged on an exhaust gas passage of the engine (not shown).

The turbocharger 1 includes a turbine wheel 3 and a compressor wheel 4 coupled to each other with a rotor shaft 2 as a rotational shaft, a casing (turbine housing) 5 for rotatably housing the turbine wheel 3, and a casing (compressor housing) 6 for rotatably housing the compressor wheel 4.

The turbine housing 5 includes a scroll portion (scroll flow passage generating portion) 7 internally having a scroll flow passage 7a, a turbine wheel housing portion 53 for housing the turbine wheel 3, and a discharge passage forming portion 55 for forming a discharge passage 171 formed downstream of the turbine wheel 3.

The compressor housing 6 includes a scroll portion 8 internally having a scroll flow passage 8a.

A turbine 30 according to some embodiments includes the turbine wheel 3 and the casing 5. A compressor 40 according to some embodiments includes the compressor wheel 4 and the casing 6.

Turbine Wheel 3

Figure 2:
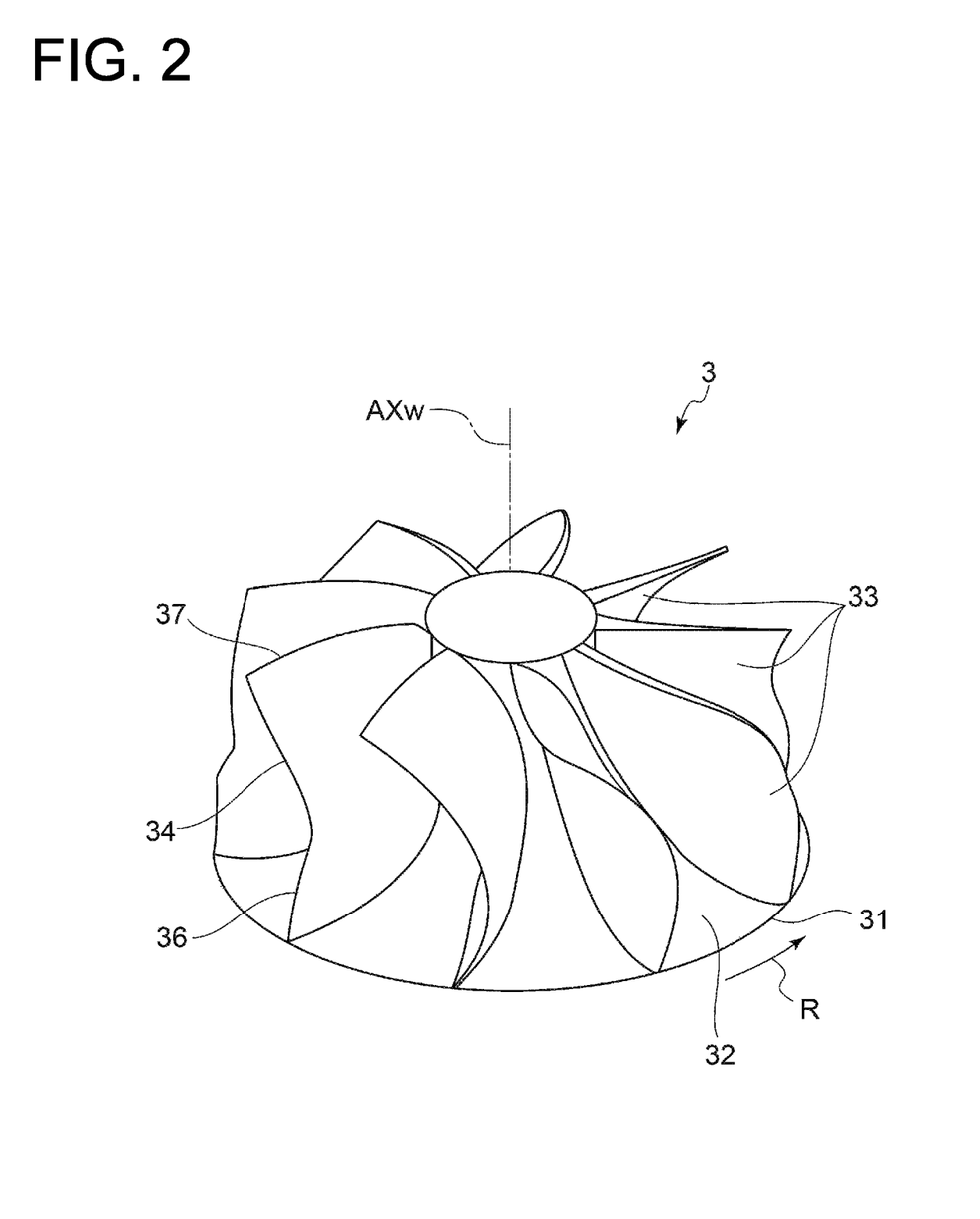
FIG. 2 is a perspective view showing the appearance of a turbine wheel according to some embodiments.

FIG. 2 is a perspective view showing the appearance of the turbine wheel 3 according to some embodiments.

Figure 3:
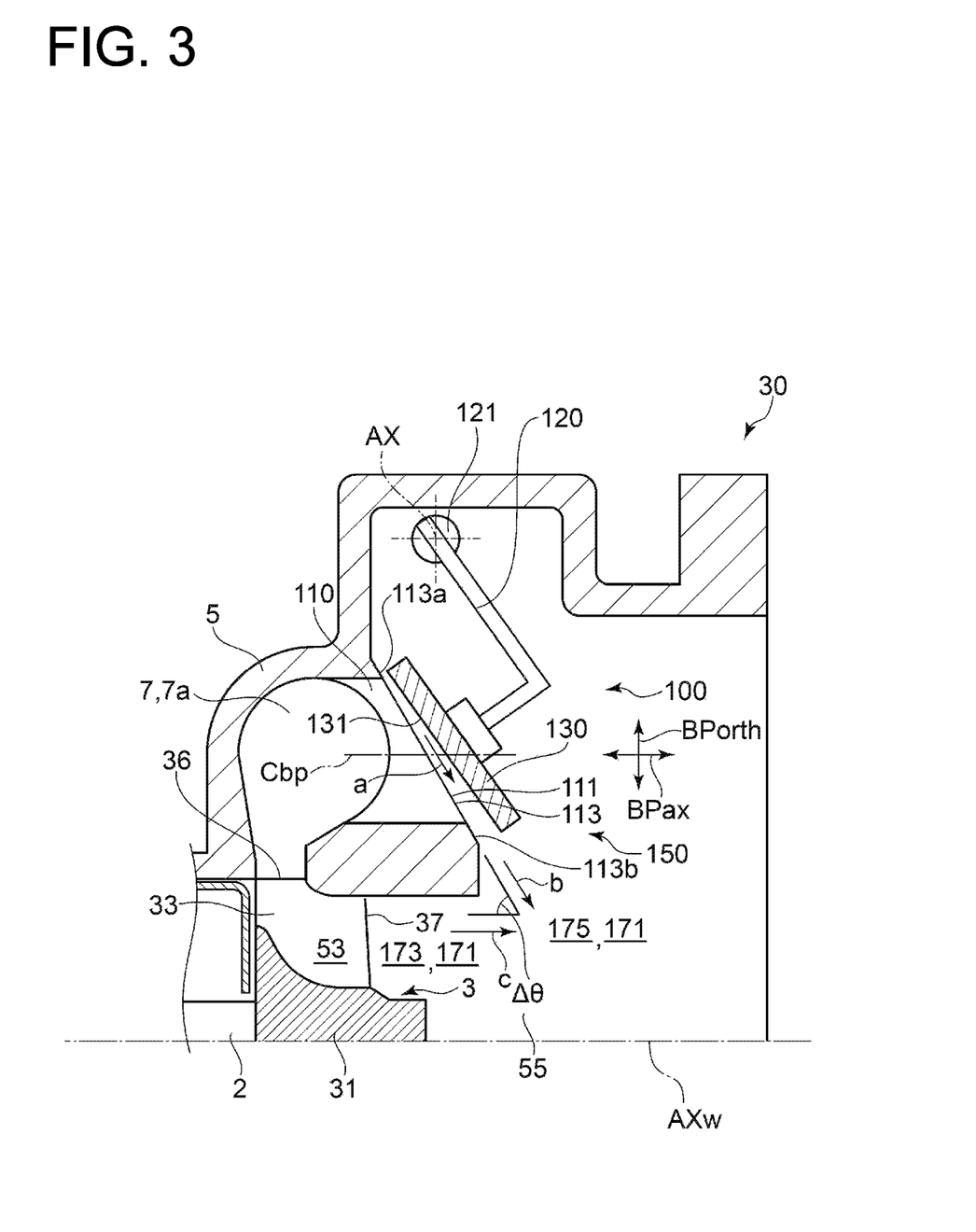
FIG. 3 is a view schematically showing the partial cross section of a turbine according to an embodiment.

FIG. 3 is a view schematically showing the partial cross section of the turbine 30 according to an embodiment.

Figure 4:
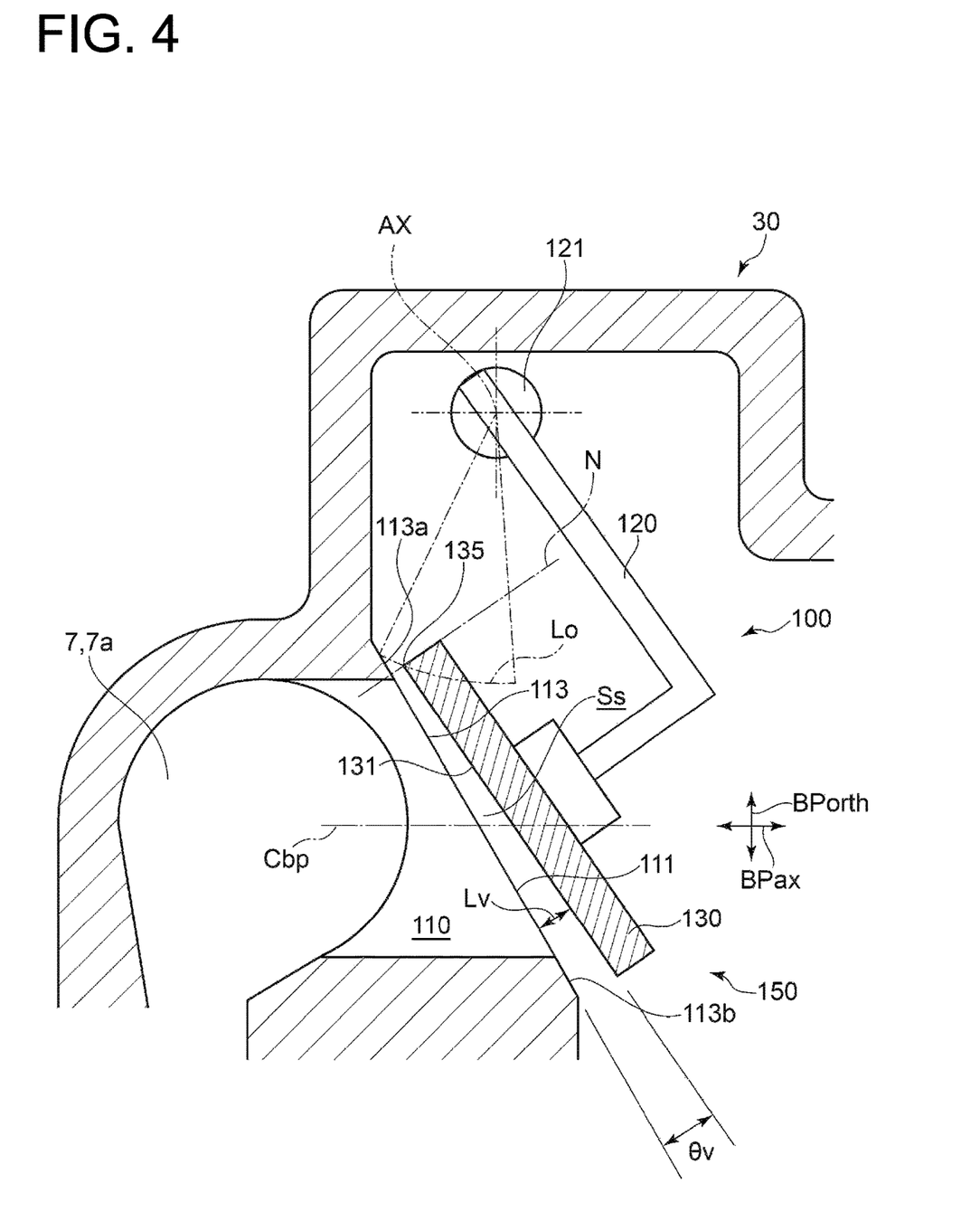
FIG. 4 is a partially enlarged view of FIG. 3.

FIG. 4 is a partially enlarged view of FIG. 3.

Figure 5:
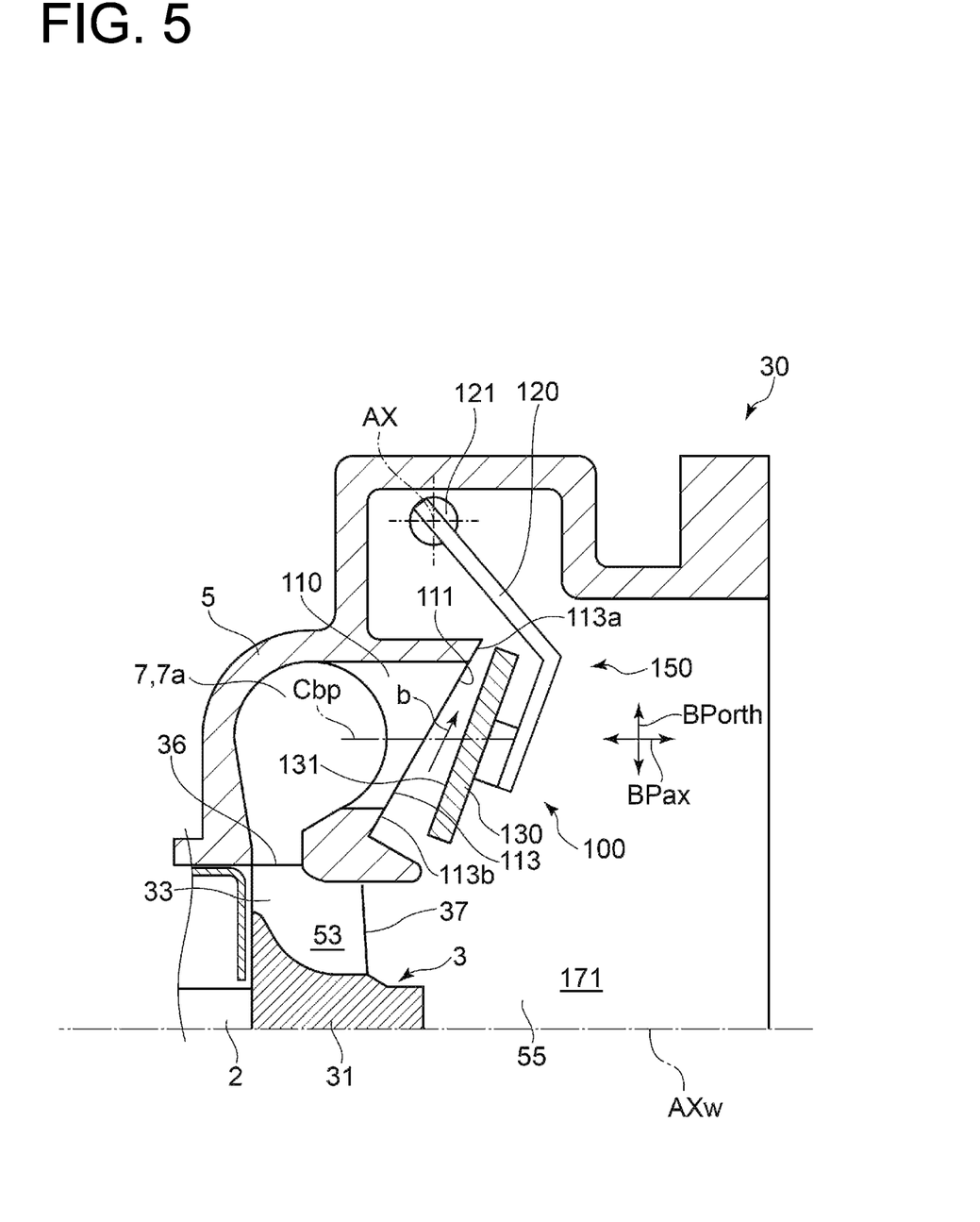
FIG. 5 is a view schematically showing the partial cross section of the turbine according to another embodiment.

FIG. 5 is a view schematically showing the partial cross section of the turbine 30 according to another embodiment.

FIGS. 3 and 4 show a case where a wastegate valve device 100, which will be described later, has a region where a valve opening degree is relatively small. Further, FIG. 5 shows a case where the wastegate valve device 100 is fully closed.

The turbine wheel 3 according to some embodiments is an impeller coupled to the rotor shaft (rotational shaft) 2 and rotated about a rotational axis AXw. The turbine wheel 3 according to some embodiments includes a hub 31 having a hub surface 32 inclined with respect to the rotational axis AXw and a plurality of blades (rotor blades) 33 disposed on the hub surface 32, in a cross section along the rotational axis AXw. The turbine wheel 3 shown in FIGS. 1 to 3 and 5 is a radial turbine, but may be a mixed flow turbine. In FIG. 2, an arrow R indicates a rotational direction of the turbine wheel 3. The plurality of blades 33 are disposed at intervals in the circumferential direction of the turbine wheel 3.

Although illustration by the perspective view is omitted, the compressor wheel 4 according to some embodiments also has the same configuration as the turbine wheel 3 according to some embodiments. That is, the compressor wheel 4 according to some embodiments is an impeller coupled to the rotor shaft (rotational shaft) 2 and rotated about the rotational axis AXw. The compressor wheel 4 according to some embodiments includes a hub 41 with a hub surface 42 inclined with respect to the rotational axis AXw and a plurality of blades (rotor blades) 43 disposed on the hub surface 42, in the cross section along the rotational axis AXw. The plurality of blades 43 are disposed at intervals in the circumferential direction of the compressor wheel 4.

In the following description, an extension direction of the rotational axis AXw may simply be referred to as the axial direction, the radial direction centered on the rotational axis AXw may simply be referred to as the radial direction, and the circumferential direction centered on the rotational axis AXw may simply be referred to as the circumferential direction.

In the turbocharger 1 thus configured, an exhaust gas serving as a working fluid for the turbine 30 flows from a leading edge 36 toward a trailing edge 37 of the turbine wheel 3. Consequently, the turbine wheel 3 is rotated, and the compressor wheel 4 of the compressor 40 coupled via the rotor shaft 2 is also rotated. Consequently, intake air flowing in from an inlet portion 40a of the compressor 40 is compressed by the compressor wheel 4 in the process of flowing from a leading edge 46 toward a trailing edge 47 of the compressor wheel 4.

Wastegate Valve Device 100

As shown in FIGS. 3 to 5, the turbine 30 according to some embodiments includes the wastegate valve device 100 disposed on a bypass passage 110 bypassing the turbine 30.

As shown in FIGS. 3 to 5, the wastegate valve device 100 according to some embodiments includes a valve seat surface 113 formed at an outlet 111 of the bypass passage 110 and a wastegate valve body 150.

The wastegate valve body 150 according to some embodiments includes a support arm 120 and a valve body 130.

In the wastegate valve body 150 according to some embodiments, the support arm 120 is supported rotatably about an axis AX. The support arm 120 may be mounted on a rotational shaft 121 configured to be rotatable about the axis AX.

In the wastegate valve body 150 according to some embodiments, the valve body 130 is supported by the support arm 120, and is configured to come into and out of contact with the valve seat surface 113 in accordance with rotation of the support arm 120. In some embodiments, the valve body 130 is a swing valve configured to be swingable in accordance with rotation of the support arm 120.

As shown in FIGS. 3 to 5, in the wastegate valve device 100 according to some embodiments, the valve seat surface 113 is inclined with respect to a direction orthogonal to an axial direction BPax of the bypass passage 110, as viewed from a direction of the above-described axis AX. The axial direction BPax of the bypass passage 110 is an extension direction of a center line Cbp of the bypass passage 110. In the following description, the direction orthogonal to the axial direction BPax of the bypass passage 110 may simply be referred to as an orthogonal direction BPorth.

As shown in FIGS. 3 to 5, the wastegate valve device 100 according to some embodiments is disposed in a region radially outward of the turbine wheel 3 relative to the leading edge 36 of the turbine wheel 3.

Further, as shown in FIGS. 3 to 5, in the wastegate valve device 100 according to some embodiments, the rotational axis AXw and the center line Cbp of the bypass passage 110 are parallel.

As shown in FIGS. 3 to 5, in the wastegate valve device 100 according to some embodiments, the axis AX, which is a rotation center of the rotational shaft 121 and the support arm 120, is located radially outward of the turbine wheel 3 relative to the center line Cbp of the bypass passage 110.

In the wastegate valve device 100 according to some embodiments, as a swing angle θv (see FIG. 5) of the valve body 130 centered on the above-described axis AX which is the rotation center of the support arm 120 increases, the size of a gap between the valve body 130 and the valve seat surface 113, that is, a distance between the valve body 130 and the valve seat surface 113 increases. Herein, the swing angle θv of the valve body 130 increase as the valve body 130 and the valve seat surface 113 are separated from each other, with the angle of the valve body 130 when the valve body 130 and the valve seat surface 113 are in contact with each other, that is, when the wastegate valve device 100 is fully closed being a reference (0 degrees). Further, in the following description, the swing angle θv of the valve body 130 may be referred to as the valve opening degree θv.

Figure 6:
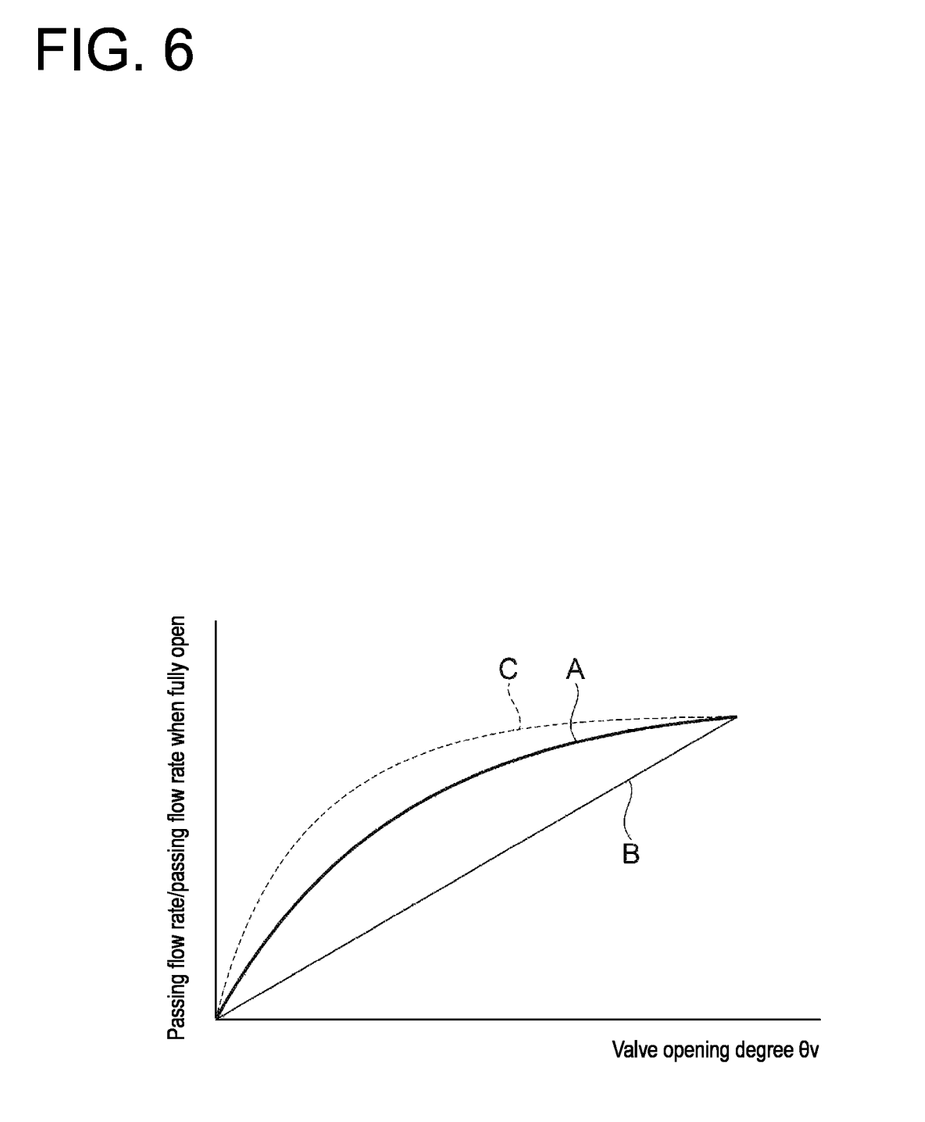
FIG. 6 is a graph showing an example of flow rate characteristics in a wastegate valve device according to some embodiments.

FIG. 6 is a graph showing an example of flow rate characteristics in the wastegate valve device 100 according to some embodiments. In the graph of FIG. 6, the horizontal axis represents the valve opening degree θv, and the vertical axis represents the ratio of the amount of the exhaust gas passing through the bypass passage 110 to the amount of the exhaust gas passing through the bypass passage 110 when the wastegate valve device 100 is fully open (passing flow rate/passing flow rate when fully open).

In the graph of FIG. 6, a flow rate characteristic A indicated by a thick solid line is an example of a flow rate characteristic in the wastegate valve device 100 according to some embodiments. In the graph of FIG. 6, a flow rate characteristic B indicated by a thin solid line is an example of an ideal flow rate characteristic. In the graph of FIG. 6, a flow rate characteristic C indicated by a dashed line is an example of a flow rate characteristic in a conventional wastegate valve device.

In the conventional wastegate valve device, the amount of change in amount of the exhaust gas passing through the wastegate valve device per unit valve opening degree is greater in a region where the valve opening degree θv is relatively small than in a region where the valve opening degree θv is relatively large. Thus, control accuracy of the exhaust gas amount in the region where the valve opening degree θv is relatively small tends to be lower than control accuracy of the exhaust gas amount in the region where the valve opening degree θv is relatively large. Therefore, in the region where the valve opening degree θv is relatively small, it is desired that the amount of change in amount of the exhaust gas passing through the wastegate valve device 100 per unit valve opening degree is smaller than that of the conventional wastegate valve device.

With the wastegate valve device 100 according to some embodiments shown in FIGS. 3 to 5, in the region where the valve opening degree θv is relatively small, even at the same valve opening degree θv, the distance between the valve body 130 and the valve seat surface 113 decreases compared to a case where the valve seat surface 113 is not inclined with respect to the orthogonal direction BPorth. Thus, in the region where the valve opening degree θv is relatively small, even at the same valve opening degree θv, a throat area Ss between the valve body 130 and the valve seat surface 113 decreases.

The throat area Ss between the valve body 130 and the valve seat surface 113 is an area of an opening where the exhaust gas flows out between the valve body 130 and the valve seat surface 113. More specifically, it is as follows.

A surface of the valve body 130 blocking the outlet 111 of the bypass passage 110 when the wastegate valve device 100 is fully closed is referred to as a closing surface 131. The above-described throat area Ss is a value obtained by integrating a distance Lv from an inner peripheral edge 115 of the bypass passage 110 at the outlet 111 of the bypass passage 110 to the closing surface 131 along the inner peripheral edge 115.

Thus, with the wastegate valve device 100 according to some embodiments shown in FIGS. 3 to 5, in the region where the valve opening degree θv is relatively small, it is possible to reduce the amount of change in the throat area Ss per unit valve opening degree compared to the case where the valve seat surface 113 is not inclined with respect to the orthogonal direction BPorth.

Thus, with the wastegate valve device 100 according to some embodiments shown in FIGS. 3 to 5, in the region where the valve opening degree θv is relatively small, it is possible to reduce the amount of change in amount of the exhaust gas passing through the wastegate valve device 100 (bypass passage 110) per unit valve opening degree compared to the case where the valve seat surface 113 is not inclined with respect to the orthogonal direction BPorth. Accordingly, it is possible to improve control accuracy of the exhaust gas amount in the region where the valve opening degree θv is relatively small.

As To Inclination Direction of Valve Seat Surface 113

For example, in the wastegate valve device 100 shown in FIGS. 3 and 4, the valve seat surface 113 is inclined toward a downstream side (the right side in FIGS. 3 and 4) of the bypass passage 110, radially inward of the turbine wheel 3 (a direction approaching the rotational axis AXw in FIGS. 3 and 4).

That is, in the wastegate valve device 100 according to some embodiments, for example, as shown in FIGS. 3 and 4, in the valve seat surface 113, an area 113a of the valve seat surface 113 located on one side across the center line Cbp of the bypass passage 110 is preferably located upstream of the bypass passage 110 relative to an area 113b located on another side, as viewed from the axis AX direction. The axis AX which is the rotation center of the valve body 130 is preferably located on the above-described one side across the center line Cbp, as viewed from the axis AX direction.

The above-described one side is the radially outer side of the turbine wheel 3 relative to the center line Cbp. The above-described another side is the radially inner side of the turbine wheel 3 relative to the center line Cbp.

For example, in the wastegate valve device 100 shown in FIGS. 3 and 4, the valve seat surface 113 is inclined with respect to the orthogonal direction BPorth such that the area 113a located on the above-described one side across the center line Cbp of the bypass passage 110 is located upstream of the bypass passage 110 relative to the area 113b located on the above-described another side. Therefore, in the state where the valve body 130 and the valve seat surface 113 are in contact with each other (when the wastegate valve device 100 is fully closed) and at least in the region where the valve opening degree θv is relatively small, as with the valve seat surface 113, the closing surface 131 is inclined with respect to the orthogonal direction BPorth such that an area located on the above-described one side across the center line Cbp of the bypass passage 110 is located upstream of the bypass passage 110 relative to an area located on the above-described another side.

Thus, at least in the region where the valve opening degree θv is relatively small, the exhaust gas flowing through the bypass passage 110 and discharged from the outlet 111 of the bypass passage 110 is guided from the above-described one side across the center line Cbp of the bypass passage 110 to the above-described another side along the above-described closing surface 131 as indicated by an arrow a in FIG. 3.

Among areas outside the bypass passage 110, in the area on the above-described one side across the center line Cbp of the bypass passage 110, the support arm 120, the rotational shaft 121, or the like exists. Thus, among the areas outside the bypass passage 110, it is more likely, in the area on the above-described another side across the center line Cbp of the bypass passage 110 than in the area on the above-described one side, that the number of members etc.

decreases which may impair the flow of the exhaust gas discharged from the outlet 111 of the bypass passage 110.

Therefore, for example, with the wastegate valve device 100 shown in FIGS. 3 and 4, since the exhaust gas flowing through the bypass passage 110 and discharged from the outlet 111 of the bypass passage 110 is guided from the above-described one side across the center line Cbp of the bypass passage 110 to the above-described another side, the flow of the exhaust gas after being discharged from the outlet 111 of the bypass passage 110 becomes smooth, making it possible to suppress a pressure loss.

As to Position of Axis AX

For example, in the wastegate valve device 100 shown in FIGS. 3 and 4, as shown in FIG. 4, the axis AX which is the rotation center of the valve body 130 preferably exists in a region farther from the above-described center line Cbp relative to a normal N to the valve seat surface 113 passing through an end portion 135 of the valve body 130 located on a valve seat surface 113 side and on the above-described one side across the above-described center line Cbp, as viewed from the axis AX direction.

Consequently, as the valve opening degree θv increases from the state where the valve body 130 and the valve seat surface 113 are in contact with each other, that is, the state where the wastegate valve device 100 is fully closed, the above-described end portion 135 moves away from the valve seat surface 113. Thus, it is possible to avoid interference between the above-described end portion 135 and the valve seat surface 113 when the valve body 130 swings.

An arc drawn by a single-dotted chain line centered on the axis AX in FIG. 4 is a locus Lo of the above-described end portion 135 when the valve body 130 swings.

As to Another Embodiment of Inclination Direction of Valve Seat Surface 113

For example, in the wastegate valve device 100 shown in FIG. 5, the valve seat surface 113 is inclined toward an upstream side (the left side in FIG. 5) of the bypass passage 110, radially inward of the turbine wheel 3 (a direction approaching the rotational axis AXw in FIG. 5).

That is, in the wastegate valve device 100 according to another embodiment, for example, as shown in FIG. 5, in the valve seat surface 113, the area 113b of the valve seat surface 113 located on the another side across the center line Cbp of the bypass passage 110 may be located upstream of the bypass passage 110 relative to the area 113a located on the one side, as viewed from the axis AX direction. The axis AX which is the rotation center of the valve body 130 may be located on the above-described one side across the center line Cbp, as viewed from the axis AX direction.

For example, in the wastegate valve device 100 shown in FIG. 5, the valve seat surface is inclined with respect to the direction orthogonal to the axial direction of the bypass passage such that the area 113b located on the above-described another side across the center line Cbp of the bypass passage 110 is located upstream of the bypass passage relative to the area 113a located on the one side. Therefore, in the state where the valve body 130 and the valve seat surface 113 are in contact with each other (when the wastegate valve device 100 is fully closed) and at least in the region where the valve opening degree θv is relatively small, as with the valve seat surface 113, the closing surface 131 is inclined with respect to the orthogonal direction BPorth such that the area located on the above-described another side across the center line Cbp of the bypass passage 110 is located upstream of the bypass passage relative to the area located on the above-described one side.

Thus, at least in the region where the valve opening degree θv is relatively small, the exhaust gas flowing through the bypass passage 110 and discharged from the outlet 111 of the bypass passage 110 is guided from the above-described another side across the center line Cbp of the bypass passage 110 to the above-described one side along the above-described closing surface 131 as indicated by an arrow b in FIG. 5.

Among the areas outside the bypass passage 110, in the area on the one side across the center line Cbp of the bypass passage 110, the member etc., such as the support arm 120 or the rotational shaft 121, exists which may impair the flow of the exhaust gas discharged from the outlet 111 of the bypass passage 110. However, due to design constraints or the like, it is also conceivable that there may be a case where it is better to let the exhaust gas discharged from the outlet 111 of the bypass passage 110 to flow more to the area on the above-described one side across the center line Cbp of the bypass passage 110 than to the area on the above-described another side.

Even in such a case, for example, with the wastegate valve device 100 shown in FIG. 5, since the exhaust gas flowing through the bypass passage 110 and discharged from the outlet 111 of the bypass passage 110 is guided from the another side across the center line Cbp of the bypass passage 110 to the one side, impairment in flow of the exhaust gas after being discharged from the outlet 111 of the bypass passage 110 is suppressed, making it possible to suppress the pressure loss.

As described above, since the turbine 30 according to some embodiments includes the wastegate valve device 100 having any one of the above-described configurations, it is possible to improve control accuracy of the exhaust gas amount in the region where the valve opening degree is relatively small.

As to Discharge Passage 171

In the turbine 30 according to some embodiments, for example, as shown in FIG. 3, the discharge passage 171 includes a discharge passage main flow region 173 and a confluence region 175.

The discharge passage main flow region 173 is arranged adjacent to the bypass passage 110 on the above-described another side across the center line Cbp of the bypass passage 110 (the radially inner side of the turbine wheel 3 relative to the center line Cbp), as viewed from the axis AX direction.

The confluence region 175 is a region where the exhaust gas discharged from the outlet 111 of the bypass passage 110 as indicated by an arrow c in FIG. 3 and the exhaust gas flowing through the discharge passage main flow region 173 as indicated by an arrow d join.

Since the turbine 30 shown in FIG. 3 includes the wastegate valve device 100 shown in FIGS. 3 and 4, as described above, the exhaust gas flowing through the bypass passage 110 and discharged from the outlet 111 of the bypass passage 110 is guided from the above-described one side across the center line Cbp of the bypass passage 110 to the above-described another side along the closing surface 131 of the valve body 130 as indicated by the arrow a in FIG. 3. Thus, the exhaust gas flowing through the bypass passage 110 and discharged from the outlet 111 of the bypass passage 110 easily joins the exhaust gas flowing through the discharge passage main flow region 173 in the confluence region 175, and disturbance in flow of the exhaust gas flowing through the discharge passage 171 is suppressed, making it possible to suppress the pressure loss of the exhaust gas in the discharge passage 171.

In the turbine 30 according to some embodiments, for example, as shown in FIG. 3, an angular difference Δθ between an extension direction toward a downstream side of the discharge passage main flow region 173 (the extension direction of the arrow c) and an extension direction of the valve seat surface 113 from the above-described one side across the center line Cbp of the bypass passage 110 toward the above-described another side on the valve seat surface 113 is preferably less than 90 degrees, as viewed from the axis AX direction.

If the above-described angular difference Δθ is less than 90 degrees, the exhaust gas flowing through the bypass passage 110 and discharged from the outlet 111 of the bypass passage 110 easily further joins the exhaust gas flowing through the discharge passage main flow region 173 in the confluence region 175, and disturbance in flow of the exhaust gas flowing through the discharge passage 171 is further suppressed, making it possible to further suppress the pressure loss of the exhaust gas in the discharge passage 171.

The extension direction of the valve seat surface 113 from the above-described one side across the center line Cbp of the bypass passage 110 toward the above-described another side is preferably directed toward a catalyst (not shown) for treating the exhaust gas, as viewed from the axis AX direction. Consequently, the exhaust gas flowing through the bypass passage 110 and discharged from the outlet 111 of the bypass passage 110 easily flows toward the catalyst. Thus, the catalyst is easily heated by the exhaust gas flowing through the bypass passage 110 and discharged from the outlet 111 of the bypass passage 110, making it possible to shorten a time required to raise a temperature of the catalyst to a temperature suitable for treating the exhaust gas.

Since the turbocharger 1 according to some embodiments includes the above-described turbine 30, it is possible to improve control accuracy of the boost pressure.

The present disclosure is not limited to the above-described embodiments, and also includes an embodiment obtained by modifying the above-described embodiments and an embodiment obtained by combining these embodiments as appropriate.

The contents described in the above embodiments would be understood as follows, for instance.

(1) The wastegate valve device 100 according to at least one embodiment of the present disclosure is a wastegate valve device disposed on a bypass passage 110 bypassing a turbine 30 of a turbocharger 1 arranged on an exhaust gas passage of an engine. The wastegate valve device 100 according to at least one embodiment of the present disclosure includes a valve seat surface 113 formed at an outlet 111 of the bypass passage 110; and a wastegate valve body 150 which includes a support arm 120 supported rotatably about an axis AX and a valve body 130 supported by the support arm 120, the valve body 130 being configured to come into and out of contact with the valve seat surface 113 in accordance with rotation of the support arm 120. In the wastegate valve device 100 according to at least one embodiment of the present disclosure, the valve seat surface 113 is inclined with respect to a direction (orthogonal direction BPorth) orthogonal to an axial direction BPax of the bypass passage 110, as viewed from a direction of the above-described axis AX.

With the above configuration (1), in the region where the valve opening degree θv is relatively small, even at the same valve opening degree θv, the distance between the valve body 130 and the valve seat surface 113 decreases compared to the case where the valve seat surface 113 is not inclined with respect to the orthogonal direction BPorth. Thus, with the above configuration (1), in the region where the valve opening degree θv is relatively small, it is possible to reduce the amount of change in amount of the exhaust gas passing through the wastegate valve device 100 (bypass passage 110) compared to the case where the valve seat surface 113 is not inclined with respect to the orthogonal direction BPorth. Accordingly, it is possible to improve control accuracy of the exhaust gas amount in the region where the valve opening degree θv is relatively small.

(2) In some embodiments, in the above configuration (1), in the valve seat surface 113, an area 113a of the valve seat surface 113 located on one side across a center line Cbp of the bypass passage 110 is preferably located upstream of the bypass passage 110 relative to an area 113b located on another side, as viewed from the direction of the above-described axis AX. The axis AX which is a rotation center of the valve body 130 is preferably located on the above-described one side across the above-described center line Cbp, as viewed from the direction of the above-described axis AX.

With the above configuration (2), since the exhaust gas flowing through the bypass passage 110 and discharged from the outlet 111 of the bypass passage 110 is guided from the above-described one side across the center line Cbp of the bypass passage 110 to the above-described another side, the flow of the exhaust gas after being discharged from the outlet 111 of the bypass passage 110 becomes smooth, making it possible to suppress the pressure loss.

(3) In some embodiments, in the above configuration (2), the above-described rotation center (axis AX) preferably exists in a region farther from the above-described center line Cbp relative to a normal N to the valve seat surface 113 passing through an end portion 135 of the valve body 130 located on a side of the valve seat surface 113 and on the above-described one side across the above-described center line Cbp, as viewed from the direction of the above-described axis AX.

With the above configuration (3), as the valve opening degree θv increases from the state where the valve body 130 and the valve seat surface 113 are in contact with each other (when the wastegate valve device 100 is fully closed), the above-described end portion 35 moves away from the valve seat surface 113. Thus, it is possible to avoid interference between the above-described end portion 135 and the valve seat surface 113 when the valve body 130 swings.

(4) In some embodiments, in the above configuration (1), in the valve seat surface 113, an area 113b of the valve seat surface 113 located on the above-described another side across a center line Cbp of the bypass passage 110 may be located upstream of the bypass passage 110 relative to an area 113a located on the above-described one side, as viewed from the direction of the above-described axis AX. The axis AX which is a rotation center of the valve body 130 may be located on the above-described one side across the above-described center line Cbp, as viewed from the direction of the above-described axis AX.

Among the areas outside the bypass passage 110, in the area on the above-described one side across the center line Cbp of the bypass passage 110, the member etc., such as the support arm 120 or the shaft located at the rotation center (axis AX) of the valve body 130, exists which may impair the flow of the exhaust gas discharged from the outlet 111 of the bypass passage 110. However, due to design constraints or the like, it is also conceivable that there may be a case where it is better to let the exhaust gas discharged from the outlet 111 of the bypass passage 110 to flow more to the area on the above-described one side across the center line Cbp of the bypass passage 110 than to the area on the above-described another side.

Even in such a case, with the above configuration (4), since the exhaust gas flowing through the bypass passage 110 and discharged from the outlet 111 of the bypass passage 110 is guided from the above-described another side across the center line Cbp of the bypass passage 110 to the above-described one side, impairment in flow of the exhaust gas after being discharged from the outlet 111 of the bypass passage 110 is suppressed, making it possible to suppress the pressure loss.

(5) A turbine 30 according to at least one embodiment of the present disclosure includes the wastegate valve device 100 having any one of the above configurations (1) to (4).

In the above configuration (5), since the turbine 30 includes the wastegate valve device 100 having any one of the above configurations (1) to (4), it is possible to improve control accuracy of the exhaust gas amount in the region where the valve opening degree θv is relatively small.

(6) A turbine according to at least one embodiment of the present disclosure includes: the wastegate valve device 100 having the above configuration (2) or (3); a turbine wheel 3; and a discharge passage forming portion 55 forming a discharge passage 171 formed downstream of the turbine wheel 3. The discharge passage 171 includes: a discharge passage main flow region 173 arranged adjacent to the bypass passage 110 on the above-described another side across the center line Cbp of the bypass passage 110, as viewed from the direction of the above-described axis AX; and a confluence region 175 where an exhaust gas discharged from the outlet 111 of the bypass passage 110 and an exhaust gas flowing through the discharge passage main flow region 173 join.

With the above configuration (6), the discharge passage main flow region 173 of the discharge passage 171 is arranged adjacent to the bypass passage 110 on the above-described another side across the center line Cbp of the bypass passage 110, as viewed from the direction of the above-described axis AX.

With the above configuration (6), since the turbine 30 includes the wastegate valve device 100 having the above configuration (2) or (3), as described above, the exhaust gas flowing through the bypass passage 110 and discharged from the outlet 111 of the bypass passage 110 is guided from the above-described one side across the center line Cbp of the bypass passage 110 to the above-described another side along the closing surface 131. Thus, the exhaust gas flowing through the bypass passage 110 and discharged from the outlet 111 of the bypass passage 110 easily joins the exhaust gas flowing through the discharge passage main flow region 173 in the confluence region 175, and disturbance in flow of the exhaust gas flowing through the discharge passage 171 is suppressed, making it possible to suppress the pressure loss of the exhaust gas in the discharge passage 171.

(7) In some embodiments, in the above configuration (6), an angular difference Δθ between an extension direction toward a downstream side of the discharge passage main flow region 173 and an extension direction of the valve seat surface 113 from the above-described one side across the center line Cbp of the bypass passage 110 toward the above-described another side on the valve seat surface 113 is preferably less than 90 degrees, as viewed from the direction of the above-described axis AX.

With the above configuration (7), if the above-described angular difference Δθ is less than 90 degrees, the exhaust gas flowing through the bypass passage 110 and discharged from the outlet 111 of the bypass passage 110 easily further joins the exhaust gas flowing through the discharge passage main flow region 173 in the confluence region 175, and disturbance in flow of the exhaust gas flowing through the discharge passage 171 is further suppressed, making it possible to further suppress the pressure loss of the exhaust gas in the discharge passage 171.

(8) A turbocharger 1 according to at least one embodiment of the present disclosure includes the turbine 30 having any one of the above configurations (5) to (7).

With the above configuration (8), it is possible to improve control accuracy of the boost pressure in the turbocharger 1.

REFERENCE SIGNS LIST

1 Turbocharger
3 Turbine wheel
5 Casing (turbine housing)
7 Scroll portion (scroll flow passage generating portion)
30 Turbine
55 Discharge passage forming portion
100 Wastegate valve device
110 Bypass passage
111 Outlet
113 Valve seat surface
120 Support arm
121 Rotational shaft
130 Valve body
131 Closing surface
135 End portion
150 Wastegate valve body
171 Discharge passage
173 Discharge passage main flow region
175 Confluence region

The invention claimed is:
1. A wastegate valve device disposed on a bypass passage bypassing a turbine of a turbocharger arranged on an exhaust gas passage of an engine, comprising:
 a valve seat surface formed at an outlet of the bypass passage; and
 a wastegate valve body which includes a support arm supported rotatably about an axis and a valve body supported by the support arm, the valve body being configured to come into and out of contact with the valve seat surface in accordance with rotation of the support arm,
 wherein the valve seat surface is inclined with respect to a direction orthogonal to an axial direction of the bypass passage, as viewed from a direction of the axis, and
 wherein the valve body has a rotation center located radially outward of a turbine wheel relative to a center line of the bypass passage, as viewed from the direction of the axis.

2. The wastegate valve device according to claim 1,
 wherein, in the valve seat surface, an area of the valve seat surface located on one side across the center line of the bypass passage is located upstream of the bypass passage relative to an area located on another side, as viewed from the direction of the axis, and
 wherein the valve body has the rotation center located on the one side across the center line, as viewed from the direction of the axis.

3. The wastegate valve device according to claim 2,
wherein the rotation center exists in a region farther from the center line relative to a normal to the valve seat surface passing through an end portion of the valve body located on a side of the valve seat surface and on the one side across the center line, as viewed from the direction of the axis.

4. A turbine, comprising:
the wastegate valve device according to claim 1.

5. A turbocharger, comprising:
the turbine according to claim 4.

6. A wastegate valve device disposed on a bypass passage bypassing a turbine of a turbocharger arranged on an exhaust gas passage of an engine, comprising:
 a valve seat surface formed at an outlet of the bypass passage; and
 a wastegate valve body which includes a support arm supported rotatably about an axis and a valve body supported by the support arm, the valve body being configured to come into and out of contact with the valve seat surface in accordance with rotation of the support arm,
wherein the valve seat surface is inclined with respect to a direction orthogonal to an axial direction of the bypass passage, as viewed from a direction of the axis,
wherein, in the valve seat surface, an area of the valve seat surface located on one side across a center line of the bypass passage is located downstream of the bypass passage relative to an area located on one side, as viewed from the direction of the axis, and
wherein the valve body has a rotation center located on the one side across the center line, as viewed from the direction of the axis.

7. A turbine, comprising:
 a wastegate valve device disposed on a bypass passage bypassing a turbine of a turbocharger arranged on an exhaust gas passage of an engine,
 a turbine wheel; and
 a discharge passage forming portion forming a discharge passage formed downstream of the turbine wheel,
wherein the wastegate valve comprises:
 a valve seat surface formed at an outlet of the bypass passage; and
 a wastegate valve body which includes a support arm supported rotatably about an axis and a valve body supported by the support arm, the valve body being configured to come into and out of contact with the valve seat surface in accordance with rotation of the support arm,
wherein the valve seat surface is inclined with respect to a direction orthogonal to an axial direction of the bypass passage, as viewed from a direction of the axis,
wherein, in the valve seat surface, an area of the valve seat surface located on one side across the center line of the bypass passage is located downstream of the bypass passage relative to an area located on another side, as viewed from the direction of the axis,
wherein the valve body has a rotation center located on the one side across the center line, as viewed from the direction of the axis,
wherein the discharge passage includes:
 a discharge passage main flow region arranged adjacent to the bypass passage on the another side across the center line of the bypass passage, as viewed from the direction of the axis; and
 a confluence region where an exhaust gas discharged from the outlet of the bypass passage and an exhaust gas flowing through the discharge passage main flow region join, and
wherein an angular difference between an extension direction toward a downstream side of the discharge passage main flow region and an extension direction of the valve seat surface from the one side across the center line of the bypass passage toward the another side on the valve seat surface is less than 90 degrees, as viewed from the direction of the axis.

* * * * *